Oct. 27, 1931.  A. NORDSTRÖM  1,829,605
ROLLER FOR CRUSHING CLODS
Filed Dec. 12, 1929
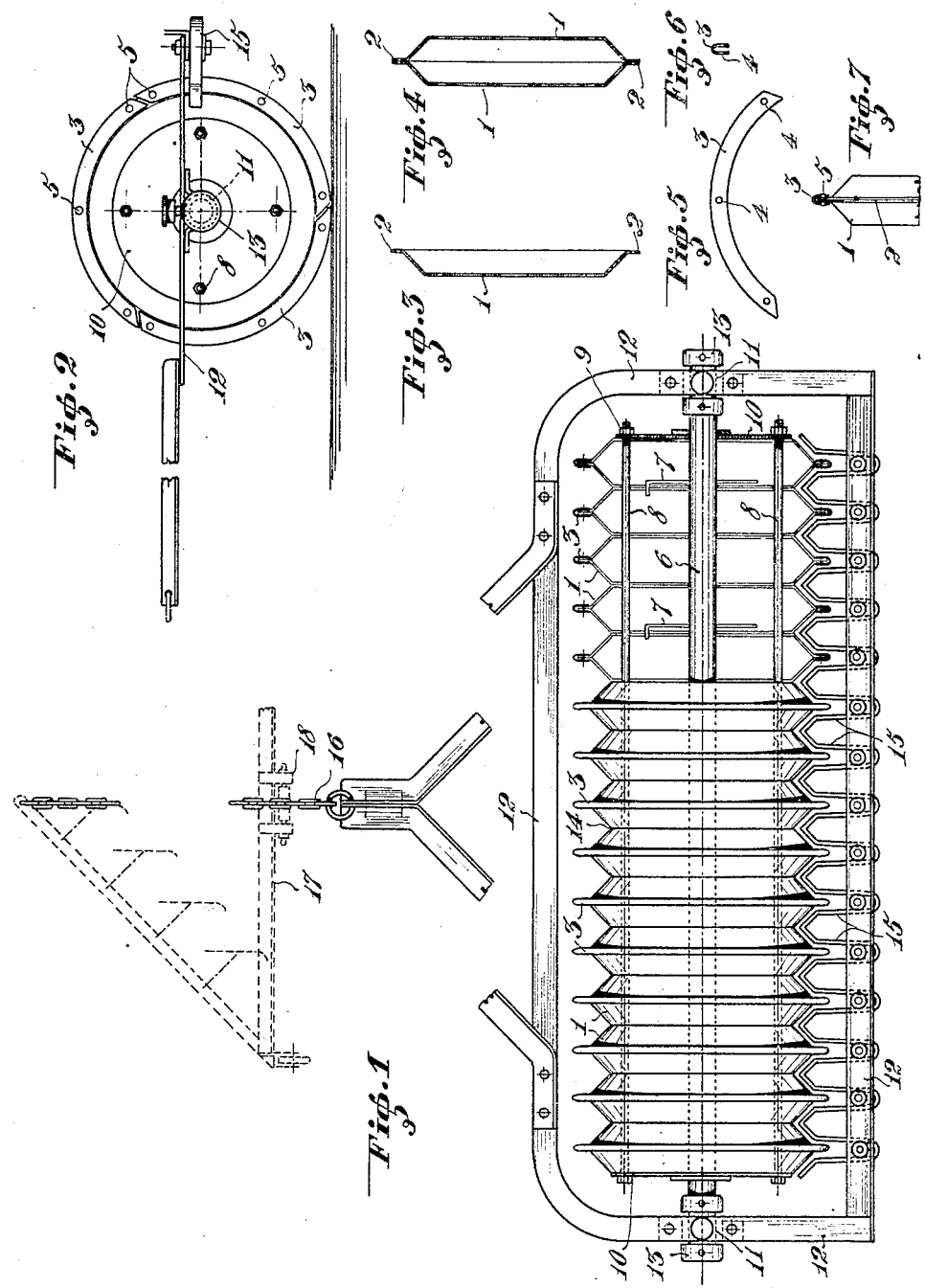
Inventor:-
Abel Nordström
by Langner, Parry, Card & Langner
Attys.

Patented Oct. 27, 1931

1,829,605

UNITED STATES PATENT OFFICE

ABEL NORDSTRÖM, OF BUENOS AIRES, ARGENTINA

ROLLER FOR CRUSHING CLODS

Application filed December 12, 1929, Serial No. 413,590, and in Argentina August 5, 1929.

The present invention relates to improvements in agricultural implement wheels, more particularly of that type or class of metallic wheels which are adapted to be formed of sheet metal.

More particularly the invention relates to improvements in implements commonly known as pulverizing wheels or disks arranged in gangs and mounted on an axle for pulverizing and mulching the soil. Each of said wheels or disks embody a suitable wheel body having a rim portion constituted by flanges which are joined together in a new and improved manner.

It is also an object of this invention to provide a new and improved wheel or disk which are assembled together upon the wheel axle so as to act as a unit.

It is also an object of the invention to provide a new and improved pulverizer wheel which is properly protected from the entry of oil and water thereinto. According to this invention the pulverizer is formed by combining a series of disks or wheels in which the flanges upon the periphery of said disks are joined in an efficient and suitable manner which may be easily replaced at any time since the combining element consists of segments of fairly substantial sheet plate secured along arcs of the peripheries.

In addition securing means are provided for the entire series of wheels so as to cause them to move and rotate in unison.

A further object of the invention is to provide means whereby the axle will itself rotate with the wheels so as to prevent any possibility of soil entering the system at the ends of the axle.

With these and other objects in view which will become apparent as the description proceeds, the invention consists in the combination and arrangement of parts set forth below, claimed in the claims and shown in the drawings, in which Figure 1 is a plan view showing the pulverizer connected to a plow, Figure 2 shows a side elevation of the same, Figure 3 is a cross sectional view of a plate from which the wheels are assembled, Figure 4 is a cross sectional view of a single wheel in assembled condition, Figure 5 is a side view of a segment for joining two disks together, Figure 6 is a cross sectional view of a segment, and Figure 7 is a partial elevational and cross sectional view showing the manner in which the flanges upon the disks are joined together by the U-shaped segments.

In the figures like reference characters denote like parts in the various views. Referring to the drawings, 1 indicates a pressed plate of steel provided at its edge with a flange 2. In Figure 4 two of these plates are shown united so that the flanges 2 thereof are in contact, thereby forming a wheel or roller which when combined with a plurality of other wheels or rolls will constitute the pulverizer.

The periphery of the wheel, or in other words, the flanges 2 may be soldered, or preferably joined by means of segments which enclose and embrace the flanges 2. These segments are provided with holes 4 through which may be passed rivets 5 or any other securing means which pass through aligned holes provided in the flanges 2.

A series of wheels or rolls are assembled as shown in Figure 1 and are secured to a shaft 6. At various positions in the shaft there are provided pins 7 which have a right angular portion designed to pass through opposing sides of two adjacent wheels or rolls.

In addition, rods 8 are passed through the entire series of wheels and rolls and the ends of these rods 8 are screw threaded so as to accommodate the nuts 9 by which the entire assembly may be tightly pressed together between the end plates 10.

The axle 6 is supported at its ends by the bearings 11 which are provided upon the frame 12 and these bearings have threaded cups 13 at the ends thereof which will prevent the entrance of earth to the interior of the bearings. The joint between each wheel or roller may be covered with carbo-lastic or other similar material in order to prevent the entry of earth and water inside the wheels or rolls.

The frame 12 has a rod or bar extending directly in back of all of the wheels and this rod carries scrapers 15 which project into the space between adjacent wheels and rolls to prevent the accumulation of earth upon the pulverizer.

At 10 a chain is shown adapted to be secured to a plow and an angle iron 17 is fixed upon said plow to which is secured the guide means 18 for guiding the chain 16.

It is of course, apparent that various modifications may be made in the above structure and it is the intent to claim in the following claims all such modifications and variations as will fall within the scope of the claims.

I claim:

1. A pulverizer comprising a plurality of wheels, each of said wheels including two flat disks having flanges at the peripheries thereof, a U-shaped segment adapted to overlap said flanges and means securing said segment and flanges together.

2. A pulverizer comprising a plurality of wheels, each of said wheels including two sheet-steel-shaped disks having flanges at the peripheral edges thereof, an arc-shaped, U-shaped iron segment, said segment being designed to overlap said flanges along an arc of the periphery of said wheel.

3. A pulverizer comprising a plurality of wheels, each wheel including two sheet-steel-shaped disks having flanges at the peripheral edges thereof, a U-shaped iron securing member adapted to enclose said flanges, a shaft upon which said wheels are mounted and a pin secured to said shaft and having a portion extending through opposing faces of adjacent wheels.

4. A pulverizer comprising a plurality of wheels, each wheel including two sheet-steel-shaped disks having flanges at the peripheral edges thereof, a U-shaped iron securing member adapted to enclose said flanges, a shaft upon which said wheels are mounted, a pin secured to said shaft and having a portion extending through opposing faces of adjacent wheels and a rod extending through said wheels so as to maintain said wheel as a unit.

5. A pulverizer comprising a plurality of wheels, each wheel being composed of two sheet-steel disks having flanges at the peripheral edges thereof, a U-shaped securing segment enclosing said flanges so as to secure said disks together, a shaft upon which said wheels are mounted, a frame secured to the ends of said shaft and a plurality of scrapers carried by said frame projecting between adjacent wheels upon said shaft for clearing the earth adhering to said pulverizer.

In testimony whereof I have signed my name to this specification.

ABEL NORDSTRÖM.